United States Patent [19]

Gosling et al.

[11] 4,155,442

[45] May 22, 1979

[54] ROTARY DEVICES FOR CLEANING CONVEYOR BELTS

[75] Inventors: Edward A. Gosling, Lesbury; William E. Bowmaker, Kenton Bank Foot, both of England

[73] Assignee: Lodna Construction Limited, Shiremoor, England

[21] Appl. No.: 849,199

[22] Filed: Nov. 7, 1977

[51] Int. Cl.² .............................................. B65G 45/00
[52] U.S. Cl. .................................. 198/498; 198/598; 198/862
[58] Field of Search ............... 198/498, 598, 599, 494, 198/496, 862; 74/230

[56] References Cited

U.S. PATENT DOCUMENTS 2,811,241  10/1957  Bogaty ................................. 198/494
3,835,982  9/1974  Zappia ................................. 198/862

FOREIGN PATENT DOCUMENTS 80050  2/1920  Austria ................................. 198/598

Primary Examiner—Robert B. Reeves
Assistant Examiner—Douglas D. Watts
Attorney, Agent, or Firm—Sughrue, Rothwell, Mion, Zinn and Macpeak

[57] ABSTRACT

A device for cleaning a conveyor belt comprises a rotatable annular scraper blade disposed below the belt, and inclined slightly to the plane of the belt so that one edge of the blade scrapes against the belt. The scraper is mounted on a carriage with side members having slots therein for adjustment of the position of the scraper relative to the belt and a worm device is disclosed for retrieving scraped material from below the scraper.

4 Claims, 4 Drawing Figures

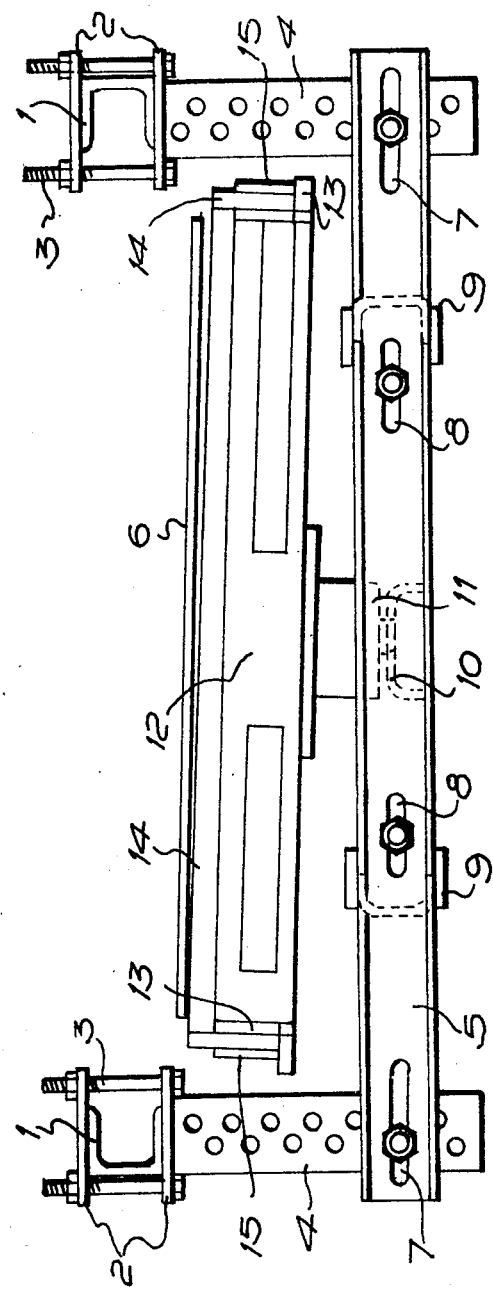

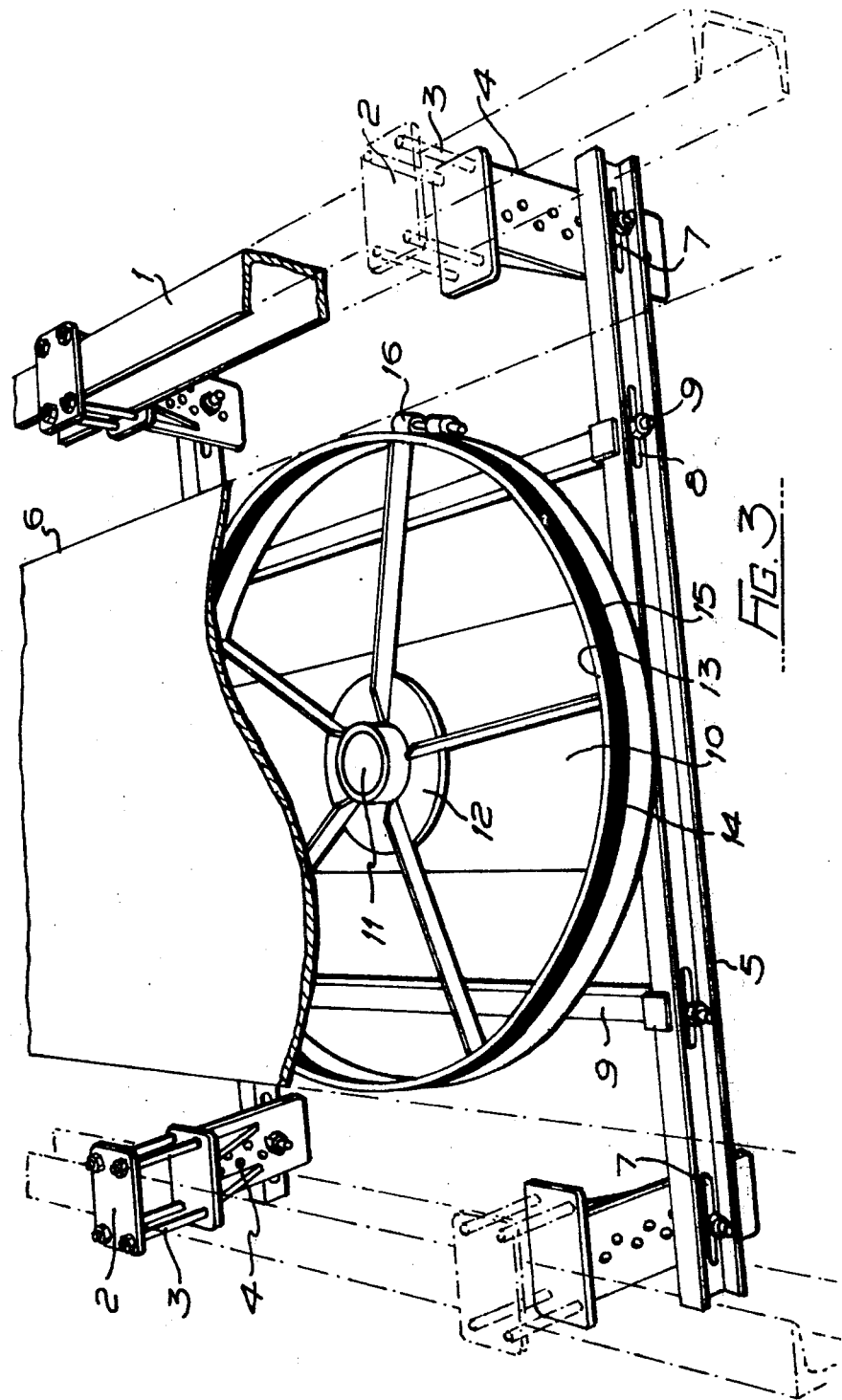

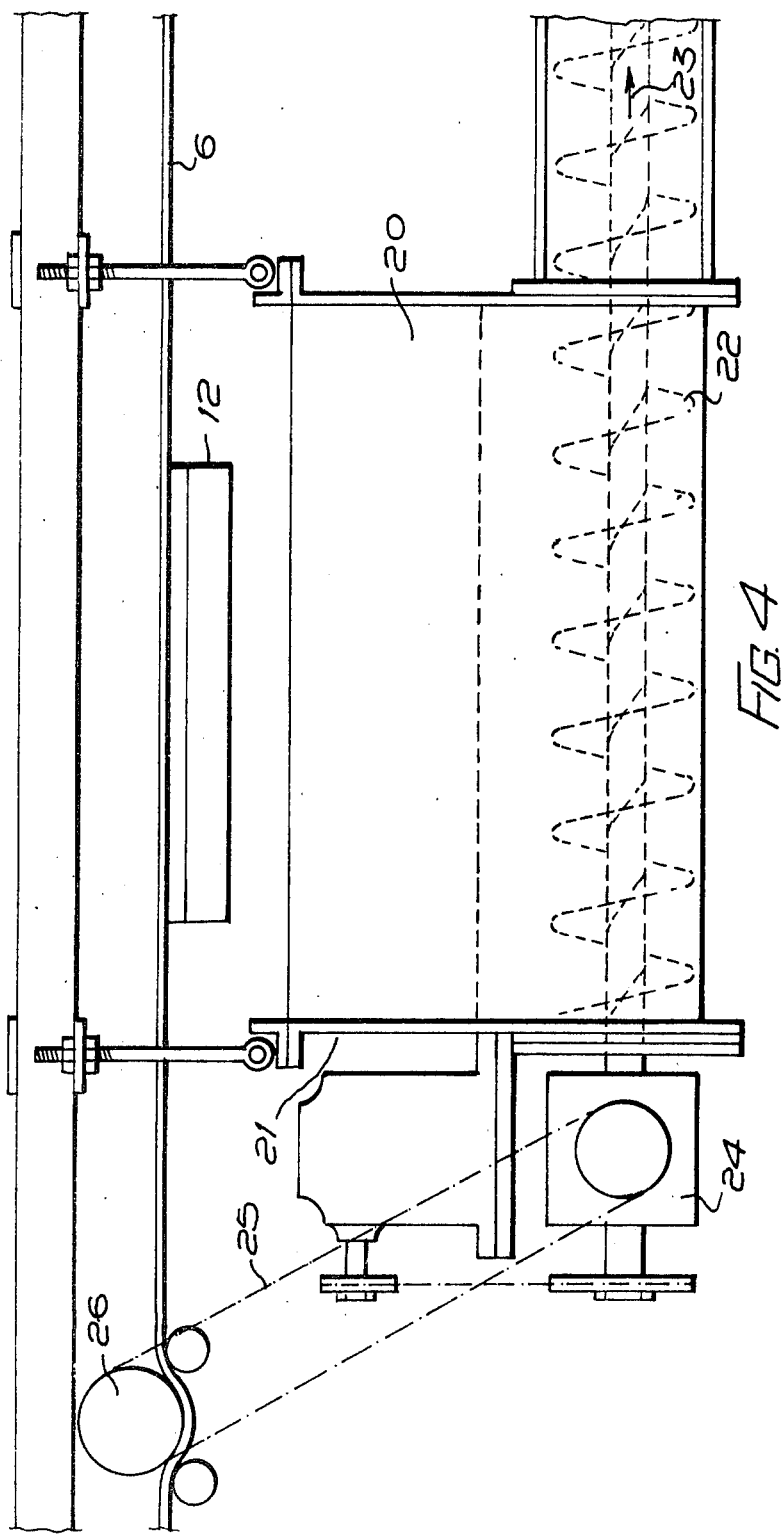

ROTARY DEVICES FOR CLEANING CONVEYOR BELTS

BACKGROUND OF THE INVENTION

This invention relates to improvements in rotary devices for cleaning conveyor belts.

During the handling and conveying of minerals, rock, ash and other friable materials, the inherent and created dust can cause a health hazard when the fine particles are blown into the atmosphere where it can affect the respiratory organs of people working in the immediate locality. In the case of the larger particles of dust, they can cause an environmental nuisance when they fall to the floor and obscure walkways and obstacles etc. thereby leading to accidents.

In order to overcome these forms of pollution, it is usual for the mineral to be sprayed by jets of water both before and during the early stages of transportation so that the movement and transfers of the mineral from one location to another will reduce this dust hazard to a minimum.

Where the transporting medium is a conveyor belt made of a rubber, plastic or neoprene substance, the effect of this wetting solution to overcome the dust problem, in turn creates another problem. A certain amount of the wet dust adheres to the surface of the carrying belt and is eventually taken by the return belt into the conveyor drive system of frictional rollers thereby causing the coefficient of friction to be reduced with the effect that the belting will slip and the efficiency of the conveyor will be impaired. In an endeavour to overcome this problem of belt slip, the tension of the belt may be increased but this in turn can lead to belt breakages due to the high tensions involved.

An additional problem associated with wet dust adhering to the surface of the return conveyor belt is that, as it dries out, the dust is deposited on the idler rollers and return drums of the conveyor. Should the mineral being carried by the conveyor be coal, such accumulated deposits can create an explosive situation, so requiring the employment of workmen to remove these deposits.

Where the dust is wet, these agglomerations cause the steel conveyor structure to corrode and deteriorate much faster than would have been the case if the dust had been removed. In a similar manner, the abrasive nature of many mineral dusts can reduce the working life of the conveyor belting and so increase the costs of material handling.

SUMMARY OF THE INVENTION

The present invention relates to devices for cleaning adhering dirt and dust from the surfaces of flexible conveyor belting and has for an object an improvement therein such that undue frictional contact pressure between a scraper and the belt is not necessary, the belt is effectively cleaned across its full width and no power supply is needed to activate cleaning agencies; such a device will prolong the working life of the belt and reduce maintenance costs of the conveying system, thereby allowing economic savings to be achieved.

A secondary object of the present invention is to provide apparatus for handling conveyor transported materials in the zone of transfer of the material from a conveyor to some other transporting mechanism or to store, wherein material, particularly pulvurent, wet or slurried material which adheres to the conveyor after the bulk of the transported material has fallen from the conveyor due to gravity, is recovered so that wastage of the material is minimised.

According to the invention, a conveyor belt cleaning device for flexible conveyor belts, comprises a frame which is capable of being attached to the rigid structure of a conveyor installation and is adjustable in the horizontal and vertical planes relative to the conveyor belt, within this frame there being located a further frame or beam which can be adjusted laterally to ensure correct alignment with the conveyor belt, and attached to said beam a bearing within which is located the axle of a horizontal wheel which is free to rotate. Attached to the rim of and circumscribing this wheel is a blade of rubber, plastic, neoprene or other such resiliant material which protrudes above the rim of the said wheel; so that by adjustment of the afore-mentioned frame, the blade of the wheel can be brought into contact with the conveyor belting such that one side of the wheel has a greater contact pressure with the belt than the other side of the wheel whereby the linear velocity of the belt will cause the wheel to revolve and the blade will scour the belt with a circular sweeping motion.

Where the structure of the conveyor installation is not rigid, the frame is preferably supported on extensible legs located on the floor beneath the conveyor.

Where it is desirable to clean the upper surface of conveyor belt, the frame may be attached to the supports surrounding the conveyor and located between the upper and lower belts.

The cleaning blade being made of a resilient material will wear during use and thus will need to be replaced. In order to effect a rapid and easy blade replacement or adjustment, the wheel will preferably be composed of two parts, an inner rim having an L shaped cross-section such that the circular cleaning blade will rest on the horizontal limb or ledge of the profile. Surrounding the outside of the cleaning blade will be an outer rim, which for the sake of easy removal may be composed of two or more segments held together and tensioned by means of clamps.

Apparatus is preferably provided for recovering material scraped from the belt.

The apparatus below the cleaning device is preferably a worm device, to which the residue falling from the cleaning device is directed by a hopper having sloping walls. The worm device is operative for transporting the residue to join the main stream of the material.

BRIEF DESCRIPTION OF THE DRAWINGS

In order that the invention may be fully understood and readily carried into effect, a preferred embodiment thereof will now be described, by way of example only, with reference to the accompanying drawings, in which:

FIG. 2 shows a sectional view of the rotary device for cleaning conveyor belts, along the line AA of the plan view.

FIG. 3 shows a perspective view of the device with part of top conveyor belting being omitted for reasons of clarity, and FIG. 4 is a view of an apparatus below the cleaner device for recovering material scraped from the belt.

DETAILED DESCRIPTION OF THE PREFERRED EMBODIMENT

Figure 1:
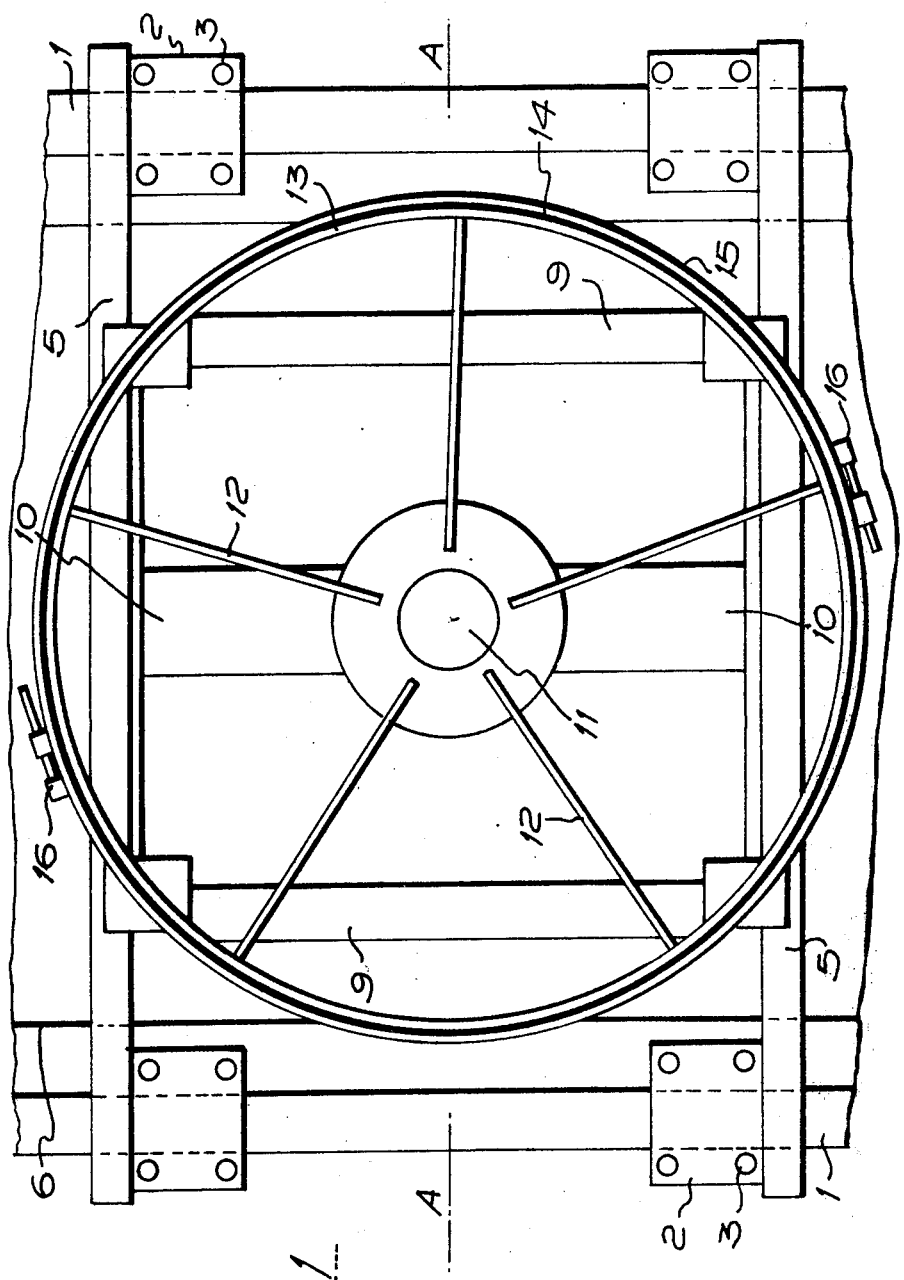
FIG. 1 shows a plan view of the rotary device for cleaning conveyor belts.

To the structural frame 1 of the conveyor installation are attached, by means of clamping plates 2 and securing bolts 3, vertical adjusting members 4 having closely spaced holes along their length such that a rigid main frame assembly of beams 5 can be raised or lowered relative to the flexible conveyor belting 6, or by differential raising or lowering of either adjusting members, the frame assembly can be tilted or inclined to the said conveyor belting. The lateral beams 5 have longitudinal slots 7 cut in the web such that they can be adjusted in a horizontal plane relative to the line of the conveyor belt, further slots 8 allow an inner frame 9 to be located and also be capable of lateral adjustment. A cross member 10 of this inner frame has fitted to it a hub 11 which receives the axle of a wheel 12, this wheel consisting of an inner rim 13 being of a generally L shaped cross-section. A circular blade of rubber, plastic, neoprene or other such resilient material 14 surrounds the outer face of this inner rim and rests on the horizontal limb of the L profile. The cleaning blade is secured in this position by means of an outer rim 15 which encircles the blade, this outer rim being formed of two or more segments which allow it to be easily dismantled. The segments are connected together and tensioned by means of screw threaded clamps 16.

As shown in FIG. 4 the material removed from the conveyor by the belt cleaning device falls into a hopper 20 with sloping walls 21, and is concentrated by the hopper to the inlet of a rotating worm feed device 22, which transports the material by means of Archimedes' screw principle, from the hopper 20, to be deposited at the same location as the bulk of the conveyed material, i.e. it is deposited on a further conveyor, fed into a truck, or added to the storage heap or fed into the processing plant as appropriate. The worm 22 is driven from a gear box 24 via belt drive 25 which takes off from a drive roller 26 of the conveyor.

The recovery by the apparatus according to the preferred embodiment invention of material adhering to a conveyor belt reduces waste, so that conveyor belt techniques can be used for more valuable materials, for example high grade ores or ores of relatively scarce minerals, with a reduced waste due to material adhering to the belt and being deposited irregularly and hap-hazardly below the return run of the conveyor.

What is claimed is:

1. A conveyor belt cleaning apparatus, comprising:
 (a) a main frame assembly mounted below the horizontal return run of a conveyor belt,
 (b) means for horizontally and vertically adjusting the main frame assembly relative to the conveyor belt,
 (c) an inner frame,
 (d) laterally adjustable means for mounting the inner frame to the main frame assembly,
 (e) a wheel bearing mounted on the inner frame between the edges of the conveyor belt,
 (f) a freely rotatable rimmed wheel having an axle rotatably mounted in the wheel bearing, the rim plane of said wheel being substantially horizontally disposed but slightly laterally inclined relative to the longitudinal direction of the conveyor belt, and
 (g) a circular blade of resilient material such as rubber, plastic, neoprene or the like attached to the wheel rim and axially protruding thereabove, said blade being in contact with the conveyor belt and bearing thereagainst under greater pressure on one side of the wheel than on the other side due to the slight lateral inclination of the wheel,
 (h) whereby the linear movement of the conveyor belt rotationally drives the wheel to cause the blade to scrape-scour the belt with a circular sweeping motion.

2. A conveyor belt cleaning apparatus as claimed in claim 1, wherein the wheel comprises an inner L shaped rim and a segmented outer rim, the cleaning blade being clamped between said inner and outer rims.

3. A conveyor belt cleaning apparatus according to claim 1, further comprising means for recovering material scraped from the belt by the blade.

4. A conveyor belt cleaning apparatus according to claim 3, wherein said recovering means comprises a hopper disposed below the wheel and arranged to catch material dislodged from the belt by the blade, and a worm for transporting the material to a desired location.

* * * * *